2,843,545

SECONDARY OIL RECOVERY BY WATER FLOODING OPERATIONS

Paul A. Wolf, Midland, Mich., assignor to The Dow Chemical Company, Midland, Mich., a corporation of Delaware No Drawing. Application January 12, 1956
Serial No. 558,618

2 Claims. (Cl. 252—8.55)

This invention relates to secondary recovery of oil by water flooding operations and is more particularly concerned with an improved process for treating flood water and oil recovery therewith.

Water flooding is widely used in the petroleum industry to effect secondary recovery of oil. By employing this process the yield of oil from a given field may be increased beyond the 20–30 percent of the oil in a producing formation that is usually recovered in the primary process. In flooding operations, water is forced under pressure through injection wells into or under oil-bearing formations to displace the oil therefrom to adjacent producing wells. The oil-water mixture is usually pumped from the producing wells into a receiving tank where the water, separated from the oil, is siphoned off, and the oil then transferred to storage tanks. It is desirable in carrying out this process to maintain a high rate of water injection with a minimum expenditure of energy. Any impediment to the free entry of water into oil bearing formations seriously reduces the efficiency of the recovery operation.

The term "flood water" as herein employed is any water injected into oil-bearing formations for the secondary recovery of oil. In conventional operations, the water employed varies from relatively pure spring water to brine and is inclusive of water reclaimed from secondary recovery operations and processed for recycling. The problems arising from the water employed depend in part on the water used. However, particularly troublesome and common to all types of water are problems directly or indirectly concerned with the presence of microorganisms, such as bacteria, fungi and algae. Microorganisms may impede the free entry of water into oil-bearing formations by producing ions susceptible of forming precipitates, forming slime and/or existing in sufficiently high numbers to constitute an appreciable mass, thereby plugging the pores of the oil-bearing formation. Pore-plugging increases the pressure necessary to drive a given volume of water into an oil-bearing formation and oftentimes causes the flooding water to by-pass the formation to be flooded. In addition, microorganisms may bring about corrosion by acting on the metal structures of the wells involved, producing corrosive substances such as hydrogen sulfide, or producing conditions favorable to destructive corrosion such as decreasing the pH or producing oxygen. The products formed as the result of corrosive action may also be pore-plugging precipitates. Usually, the difficulties encountered are a combination of effects resulting from the activity of different microorganisms.

In the conventional treatment of flood water, various antimicrobial compositions have been employed in attempts to overcome some of these difficulties. Certain of the compositions are not adapted to be employed in the wide variety of flood waters encountered in practice because factors such as solubility of the agents and range of effectiveness are limited by the pH and/or ions present. For example, halogenated phenolic compounds are most effective in alkaline waters while quaternary amines may react with certain anions present. Many microbicides are not desirable because they render the flood water corrosive to well-casings. For example, chlorine is used to a certain extent where fresh water is available. However, it is readily lost from solution and easily consumed by organic matter. When it is employed in high concentrations to compensate for the loss, excessive corrosion of well equipment occurs. Other antimicrobial compositions such as formaldehyde and organic mercurial compounds are generally too hazardous to use, while quaternary amines may become ineffective by inducing the formation of resistant strains of microorganisms. Thus, there is a need for a commercially available method of treating flood water which does not exhibit the foregoing disadvantages.

Accordingly, it is an object of this invention to provide an improved method for treating the flood water employed in the secondary recovery of oil. Another object is to provide a method for inhibiting growth of microorganisms present in flood water to be used in secondary oil recovery. A further object is to provide an improved secondary oil recovery method by injecting treated flood water into the oil bearing strata around the producing well to release oil therefrom. Other objects and advantages will become evident from the following specifications and claims.

According to the present invention it has been discovered that by incorporating in the flood water, to be injected into oil-bearing formations, a minor proportion of a composition comprising a water-soluble condensation product obtained by the reaction of from 2.0 to 3.5 molecular proportions of formaldehyde with one molecular proportion of an aliphatic polyamine having the general formula:

$$H_2N-(-C_nH_{2n}NH-)_x-H$$

wherein $n$ is an integer from 2 to 3, inclusive, and $x$ is an integer of from 1 to 4, inclusive, growth of microorganisms is inhibited. Thus pore-plugging, corrosion and other problems directly or indirectly associated with secondary recovery are alleviated and the foregoing objectives attained. The invention then consists of the improved method of treating flood water and recovery of oil therewith herein fully described and particularly pointed out in the claims.

The aliphatic amino compounds from which the condensation products are derived include polyamines such as 3,3'-iminobispropylamine, diethylenetriamine, propylenediamine, ethylenediamine, triethylenetetramine, and tetraethylenepentamine.

The condensation products are very soluble in water and in polar organic solvents such as methanol and ethanol. Stable, non-gelling water solutions containing at least 25 percent product by weight may be prepared readily. This property makes it practicable to ship aqueous concentrates of the product by tank cars from which they can be metered directly into the flood water at the injection site.

In the practice of this invention an operable quantity of the water-soluble polyamine-formaldehyde condensation product is added to the flood water prior to its injection into the oil-bearing formations or through injection wells. Injection wells, specially equipped to apply the flood water into oil-bearing formations at high pressure, are spaced around or adjacent to producing wells. An arrangement where four or six injection wells surround a producing well is suitable but other conventional arrangements may be used. The water-soluble condensation product is metered most conveniently into the water line supplying the flood water to the injection well or wells, or into the water line entering a pump when one is used to create the necessary injection pressure. The water employed is usually filtered and sometimes stored at or near the recovery site; when recycled water is used it is processed before reinjection. Where there is a storage tank, a filter system, or a processing plant, incorporation of the antimicrobial composition in the flood water is made at any of these points. The water so treated is then injected into the input well or wells.

Any of the various forms of the condensation product may be added to the flood water, such as a concentrate in water or other solvent, a crude aqueous reaction product mixture obtained in its preparation, a finely divided powder, or a paste. The preferred form from the standpoint of convenience and practicability is a water concentrate of the condensation product.

The condensation product may be added to the flood water in any amount adapted to inhibit the growth of microorganisms. The optimum concentration will vary with the nature of the water employed in the flooding operations. Factors such as the amount of dissolved gases, the amount and kind of ions present, the alkalinity and the kind and combinations of microorganisms peculiar to a given field must be considered in determining the optimum concentration. A method which may be used to determine effective concentrations is described later in this specification. Generally, desirable results may be obtained when the condensation product is added in an amount sufficient to give a concentration of 25 parts per million parts of flood water although other concentrations may be used. In some instance it is possible to employ as little as 5 parts per million parts of condensation product to obtain an inhibiting effect. The upper limit is dictated by economic considerations. The preferred range is 15 to 50 parts per million.

In the preferred practice of this invention a 25 to 30 percent aqueous solution of the antimicrobial composition is metered into the flood water at a rate sufficient to give the desired concentration of 15 to 50 parts per million in the flood water.

A large group of bacteria as well as fungi do not adversely affect flood water treated in accordance with the present invention. The organisms of the Desulfovibrio species, more commonly known as sulfate reducing bacteria, are known particularly to preclude efficient operation of oil recovery by conventional water flooding techniques by producing hydrogen sulfide which reacts on iron and iron salts to precipitate black ferrous sulfide. These organisms are resistant to the effects of many known antimicrobial compounds. By treating flood water in accordance with the invention with the water-soluble polyamine-formaldehyde condensation products, the undesirable growth of these sulfate reducing microorganisms is inhibited and the production of hydrogen sulfide arrested.

The effective concentration of water-soluble polyamine-formaldehyde condensation product to employ in the treated flood water for controlling these organisms may be determined by modifying flood water containing ferrous and sulfate salts with varying amounts of the condensation product, inoculating with organisms of the Desulfovibrio species and incubating under anaerobic conditions for 30 days at 20°–25° C. A concentartion which effectively controls this species will also control the growth of other undesirable organisms.

In a test carried out by inoculating a simulated brine medium containing iron and sulfate ions with *Desulfovibrio desulfuricans* organisms and incubating under anaerobic conditions for three days at 20°–25° C., a copious precipitate of black ferrous sulfide formed indicating abundant growth of the organisms. Similar media modified by adding 25 parts per million of the condensation product, inoculated with the same organisms and incubated at 20°–25° C., supported no growth of the organisms as evidenced by no formation of ferrous sulfide even after 30 days. The water-soluble condensation products derived from the aliphatic polyamines and formaldehyde listed below exhibit inhibiting action.

| Amine: | Moles HCHO/ mole amine |
|---|---|
| Diethylenetriamine | 2.0 |
| Diethylenetriamine | 2.2 |
| Diethylenetriamine | 2.5 |
| Diethylenetriamine | 3.0 |
| Diethylenetriamine | 3.5 |
| Ethylenediamine | 2.0 |
| Triethylenetetramine | 2.4 |
| Tetraethylenepentamine | 2.0 |
| Tetraethylenepentamine | 3.5 |

These condensation products inhibit the growth of other organisms such as *S. typhosa*, a gram-negative aerobe. The growth of the latter on nutrient agar plates was completely inhibited by the addition therein of the condensation product in a concentration of 50 parts per million. Other species whose growth may be similarly inhibited include *M. pyogenes* var. *aureus*, a gram positive aerobe; the Crenothrix species, commonly referred to as the iron bacteria; the Pseudomonas species, particularly troublesome for their slime formation; and fungi such as *A. terreus* and *R. nigricans*.

The condensation product as herein employed may be prepared by condensing formaldehyde with an appropriate aliphatic polyamine. In a preferred method, an aqueous solution of formaldehyde (such as formalin) is added portionwise to the polyamine in the presence of a solvent such as water or alcohol with sufficient cooling and stirring to maintain the temperature at or below 60° C. The resulting condensation product is a clear aqueous composition. If desired, the water and/or alcohol may be removed at reduced pressure with little or no heating to obtain the product as an anhydrous solid.

The following examples illustrate the invention but are not to be construed as limiting.

*Example 1*

A 25 percent aqueous concentrate of a condensation product obtained by condensing 1 molecular proportion of diethylenetriamine with 2.2 molecular proportions of formaldehyde is metered from a tank car through a chemical feed pump into a brine line at a point just prior to its entry into the high pressure injection pump, delivering the brine to input wells in a water flooding project. The brine entering the pump contains 25 parts per million of the condensation product. The resulting treated brine is pumped into the oil-bearing strata of the project through six flooding wells drilled therein, equally spaced apart and equidistant from a producing well drilled into the same strata. The brine comes into contact with the oil, causing it to flow toward the producing well, where it is recovered.

*Example 2*

An aqueous solution of a product obtained by condensing 1 molecular proportion of tetraethylenepentamine with 3.5 molecular proportions of formaldehyde and containing 25 percent solids is metered into a water line coming from a water processing plant in which water for a flooding project is prepared for injection into the oil-bearing strata of an oil field, the addition being made at a rate to give a concentration of 50 parts per million of the condensation product in the flooding water. The resulting treated water is injected into the oil sands. Oil from the oil-bearing strata is thereby driven to adjacent producing wells and recovered therefrom as an oil-water mixture.

*Example 3*

A 25 percent aqueous concentrate of a condensation product of one molecular proportion of 3,3'-iminobis-propylamine and 2.5 molecular proportions of formaldehyde is added to water in a storage tank to give a final concentration of the condensation product in the water of 30 parts per million. The resulting treated water is pumped from the storage tank into the oil-bearing sand formation of a flooding project. The treated water seeps through the sand formations and the resulting water-oil mixture is recovered from adjacent producing wells.

*Example 4*

A 30 percent aqueous concentrate of a condensation product of one molecular proportion of ethylenediamine and two molecular proportions of formaldehyde is metered into spring water at a rate to give a concentration therein of 15 parts per million. The resulting treated water is pumped into the oil-bearing strata of a flooding project with a high pressure injection pump into input wells drilled into the oil-bearing strata. The oil is thereby driven to an adjacent producing well and recovered as an oil-water mixture.

I claim:

1. A flooding process for recovering oil from an oil bearing stratum in an earth formation which comprises injecting into the stratum a flooding water containing a water-soluble condensation product obtained by the reaction of from 2.0 to 3.5 molecular proportions of formaldehyde with 1.0 molecular proportion of an aliphatic polyamine having the general formula:

$$H_2N-(-C_nH_{2n}NH-)_x-H$$

wherein $n$ is an integer of from 2 to 3, inclusive, and $x$ is an integer from 1 to 4, inclusive.

2. A process useful for recovering oil from an oil bearing stratum in an earth formation which comprises injecting into the stratum a flooding water containing a water-soluble condensation product obtained by the reaction of from 2.0 to 3.5 molecular proportions of formaldehyde with 1.0 molecular proportion of an aliphatic polyamine having the general formula:

$$H_2N-(-C_nH_{2n}NH-)_x-H$$

wherein $n$ is an integer of from 2 to 3, inclusive, and $x$ is an integer from 1 to 4, inclusive, wherein said water-soluble condensation product is present in an amount of at least 5 parts per mililon parts of flood water.

References Cited in the file of this patent

UNITED STATES PATENTS

| | | |
|---|---|---|
| 2,347,012 | Waugh | Apr. 18, 1944 |
| 2,419,755 | Albaugh | Apr. 29, 1947 |
| 2,496,354 | Moyer et al. | Feb. 7, 1950 |
| 2,733,206 | Prusick et al. | Jan. 31, 1956 |

OTHER REFERENCES

La Susa: Corrosion in Water-Flood and Disposal Systems, article in World Oil, April 1955, pages 242, 244 and 245.